(12) United States Patent
Schowalter

(10) Patent No.: US 8,025,327 B1
(45) Date of Patent: Sep. 27, 2011

(54) THEFT AND TAMPER RESISTANT VEHICLE INTERIOR

(75) Inventor: Jean-Paul Schowalter, Fullerton, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/862,943

(22) Filed: Aug. 25, 2010

Related U.S. Application Data

(62) Division of application No. 11/617,995, filed on Dec. 29, 2006, now Pat. No. 7,826,934.

(60) Provisional application No. 60/867,346, filed on Nov. 27, 2006.

(51) Int. Cl.
*B60R 7/04* (2006.01)

(52) U.S. Cl. .... 296/70; 296/24.34; 296/152; 296/190.1; 297/411.3

(58) Field of Classification Search ............ 296/70, 296/24.34, 37.8, 153, 146.7, 37.13, 1.07, 296/109, 190.01, 152; 297/411.3, 411.38, 297/411.32, 115, 188.19; 224/275, 400; B60R 27/00; B60R 7/04
See application file for complete search history.

(56) References Cited

U.S. PATENT DOCUMENTS

| | | | |
|---|---|---|---|
| 4,281,526 A | | 8/1981 | Lipschutz |
| 5,203,226 A | | 4/1993 | Hongou et al. |
| 5,823,599 A | * | 10/1998 | Gray ............................ 296/37.8 |
| 6,049,288 A | * | 4/2000 | Kawasaki .................. 340/815.4 |
| 6,709,041 B1 | * | 3/2004 | Hotary et al. .................... 296/70 |
| D501,811 S | * | 2/2005 | Fukuda et al. ................ D12/192 |
| 6,857,688 B2 | * | 2/2005 | Morrison et al. .......... 296/146.7 |
| 7,044,529 B2 | * | 5/2006 | Svenson et al. .............. 296/37.8 |
| 7,201,420 B2 | * | 4/2007 | Vican ......................... 296/37.12 |
| 7,265,306 B2 | * | 9/2007 | Radu ............................. 200/310 |
| 7,616,977 B1 | | 11/2009 | Nortman |
| 2003/0052513 A1 | * | 3/2003 | Uleski .......................... 296/152 |
| 2005/0006918 A1 | * | 1/2005 | Neumann et al. .......... 296/24.34 |
| 2006/0054482 A1 | | 3/2006 | Radu |
| 2007/0176448 A1 | * | 8/2007 | Spykerman et al. ....... 296/24.34 |
| 2008/0093908 A1 | | 4/2008 | Cooley et al. |
| 2009/0256374 A1 | | 10/2009 | Augustyn |

OTHER PUBLICATIONS

Office Action mailed Jul. 9, 2009 in U.S. Appl. No. 11/617,995.
Response to Office Action filed Sep. 9, 2009 in U.S. Appl. No. 11/617,995.
Office Action mailed Jan. 5, 2010 in U.S. Appl. No. 11/617,995.
Response to Office Action filed Apr. 5, 2010 in U.S. Appl. No. 11/617,995.
Interview Summary mailed Jun. 16, 2010 in U.S. Appl. No. 11/617,995.
Notice of Allowance mailed Jun. 24, 2010 in U.S. Appl. No. 11/617,995.

* cited by examiner

*Primary Examiner* — Glenn Dayoan
*Assistant Examiner* — Sunsurraye Westbrook
(74) *Attorney, Agent, or Firm* — Plumsea Law Group, LLC

(57) ABSTRACT

A theft and tamper resistant vehicle interior is disclosed. The front compartment of the vehicle interior has a concealed mode and an operating mode. During the concealed mode, multiple components, including a display region, a gear shifter, a center armrest, a side armrest, and a central control module may be completely or partially hidden from view. During the operating mode, each of these components may be revealed.

25 Claims, 12 Drawing Sheets

THEFT AND TAMPER RESISTANT VEHICLE INTERIOR

REFERENCE TO RELATED APPLICATIONS

This application is a Divisional of U.S. patent application Ser. No. 11/617,995 filed on Dec. 29, 2006, now U.S. Pat. No. 7,826,934, which claims priority to U.S. Provisional Application No. 60/867,346 filed on Nov. 27, 2006.

BACKGROUND OF THE INVENTION

1. Field of the Invention

This invention relates to the field of vehicle interiors including vehicle controls and gauges, and more particularly to a theft and tamper resistant vehicle interior in which many elements are concealed in a default condition and revealed only when actuated into an operating condition.

2. Background of the Invention

In general, the basic considerations in vehicle interior design are the safety and comfort of the driver and passengers. For the front seat compartment, where the majority of the controls and instruments are located for operation by the driver or front seat passenger, more attention has been paid to the need for ergonomic controls and instruments. Most vehicle manufacturers have offered different instrument layouts and different types of controls including voice activated ones in an attempt to facilitate operation of the vehicle. With an increased array of electronic components and features in vehicles, a challenge has been to design an instrument panel that enables easy access to and operation of all of the onboard features, without being too complicated, appearing too cluttered, or requiring excessive user operation of the onboard computer system.

Another factor in vehicle interior design has been vehicle security as theft and vandalism to vehicles is always a concern. Most often security revolves around alarm systems, locks, electronic component lock-outs, and ways to keep easily stolen components and personal valuables out of view. This focus has resulted in many vehicle interiors designed with storage compartments for locking away valuables, and even audio components which have removable and stowable front faces that can be stored out of plain sight. In an effort to thwart would-be thieves, some audio components are fixed in place but almost hidden from view requiring, ironically, undue searching even by the authorized user.

In most instances, the driver controls and gauges are arrayed in some format on the dashboard with the gauges protected by a glass covering or the like. Sometimes LCD or LED displays are used. The displays and gauges are generally in plain view on the dashboard, and can provide a passerby information about the electronic components in the vehicle. For example, a relatively large rectangular LCD screen on the dashboard usually signals the presence of a navigation system. Such components may be the prey for would-be thieves, and most vehicles have such displays in plain view.

With the increased complexity and proliferation of electronic devices, on-board computer systems and other vehicle options, there is an ongoing need to simplify and streamline the presentation of information and availability of controls to the driver. With the increased number of devices that must be controlled or whose operational status must be displayed, there is a need to more closely manage the very limited real estate of an instrument panel. There is a need for a vehicle that includes provisions for reducing the visibility and operability of large panel displays and other electronic or mechanical components when the vehicle is not running without minimizing the visibility of these components during times when the driver needs to use them. Additionally, there is a need for anti-theft provisions that do not detract from the general aesthetic appeal and ergonomics the vehicle.

SUMMARY

The present invention addresses the drawbacks of conventional vehicle front seat compartment controls and displays by concealing a majority of them from view until they are revealed by some actuation by a driver or other authorized user. The main areas of the vehicle interior which are affected are a front instrument panel or dashboard, a center control area, a center console and the interiors of the front doors. Each of these areas is designed to have a default concealed condition and an operating condition in which more functional controls and displays are revealed. The four main areas could all be in the default condition at the same time, and they could all be in the operation condition at once. It is also possible that each of the four main areas could be independently actuated so that any one or a combination are in the default condition with the others in the operating condition depending on the situation. Each of these areas is described in turn.

The front instrument panel comprises a forward portion mounted to a vehicle front wall or dashboard and comprising at least one display area that is partially or completely concealed in the default condition. In the operating condition, the display area is completely revealed. In one aspect of the invention, the instrument panel includes an upper display area that is completely concealed in the default condition, and a lower display area that is partially concealed in the default condition. A plurality of movable panels is arranged about the display areas, and upon actuation, the panels move to reveal the display areas. The upper display area is covered by an airfoil shaped panel that rotates about an axis so that its front edge moves downward to reveal the upper display when actuated. The lower display area has the lower portion thereof partially covered by the long sides of two L-shaped center panels which move downward and outward to completely reveal the lower display when actuated.

Underneath and integrated with the instrument panel is a central control area in which the shorter sides of the two L-shaped center panels are arranged back-to-back to partially cover a central control display and surround an ignition control switch when in the default condition. When actuated, the downward and outward movement of the L-shaped center panels reveals more of the central control display and controls surrounding the ignition control switch. These controls may function as the driver's shortcuts to actuate certain features or options on the vehicle. These central controls may also be coupled to the display areas of the instrument panel so that only the information and controls for the feature selected by the driver are displayed and made available.

Moving downward and rearward from the central control area is the center console situated between the two front seats. In the default condition a pair of panels covers the entire console area. When actuated into the operating condition, the two panels open like sliding doors to enable the gear shifter to move upward from the console and into an operational position, and a center armrest comprising a center bar and an arm rest pad on either side thereof moves upward from the console with the bar and pads in a vertical orientation. After the armrest reaches a vertical limit, the pads rotate about the bar into a horizontal orientation, and the armrest lowers down to rest on or adjacent the console surface.

The door interiors in the default condition have only an open/close control visible on the door ledge and a lower storage area. When actuated to the operating condition, a middle panel moves downward to reveal a door armrest and window and lock controls on the horizontal surface, as well as providing a recess or space for resting an arm or hand. another feature whose functionality is revealed is a vertically oriented grab bar that extends from an upper panel to the lowered middle panel. When in this operating condition, the full array of window and lock controls are now visible and available to the driver and/or passenger.

These features and the subparts can be thought of as various aspects of the invention as follows.

In one aspect the invention provides a front seat compartment of a motor vehicle interior comprising a concealed mode wherein a component of the front seat compartment is hidden, and an operating mode in which said component is hidden from view.

In another aspect, the component is a display region associated with a forward portion of the motor vehicle interior.

In another aspect, the component is a gear shifter associated with a center console of the motor vehicle interior.

In another aspect, the component is a center armrest associated with a center console of the motor vehicle interior.

In another aspect, the component is a plurality of control buttons associated with a forward portion of the motor vehicle interior.

In another aspect, the component is a side armrest associated with a door interior of the motor vehicle interior.

In another aspect, the invention provides a display region integrated into a forward portion of a motor vehicle interior comprising a concealed mode in which a majority of said display region is hidden from view, and an operating mode in which the entirety of said display region is revealed.

In another aspect, the display region is an upper display region associated with a lower display region.

In another aspect, the upper display region includes a rear camera view.

In another aspect, the lower region includes a three dimensional navigational system.

In another aspect, the forward portion comprises three distinct movable panels.

In another aspect, the three distinct movable panels include an airfoil panel that is tilted during the operating mode.

In another aspect, the three distinct panels include a first lower panel and a second lower panel and where the first lower panel and the second lower panel slide down the forward portion during the operating mode.

In another aspect, the invention provides a gear shifter mounted to a center console area of a motor vehicle wherein said gear shifter is hidden from view in a concealed mode and said gear shifter extends upward from the center console in an operating mode.

In another aspect, the center console includes a first center panel and a second center panel.

In another aspect, the first center panel and the second center panel are disposed against one another during the concealed mode.

In another aspect, the first center panel and the second center panel are separated by a gap during the operating mode.

In another aspect, the gear shifter is disposed through the gap during the operating mode.

In another aspect, the gear shifter is disposed below the first center panel and the second center panel during the concealed mode.

In another aspect, a center armrest is associated with the center console area.

In another aspect, the invention provides a center arm rest integrated to a center console area of a motor vehicle interior comprising a concealed mode in which said center arm rest is retracted into the center console and hidden from view, and an operating mode in which said center arm rest is revealed and disposed on top of the center console.

In another aspect, the center console area comprises a first center panel and a second center panel.

In another aspect, the first center panel and the second center panel are disposed against one another during the concealed mode.

In another aspect, the first center panel and the second center panel are separated by a gap during the operating mode.

In another aspect, the center armrest is disposed through the gap when during the operating mode.

In another aspect, the center armrest is disposed under the first center panel and the second center panel during the concealed mode.

In another aspect, a gear shifter is associated with the center console.

In another aspect, the invention provides a center control module of a motor vehicle interior comprising a central actuator and a plurality of control buttons disposed adjacent to said central actuator wherein said control buttons are hidden from view in a concealed mode and revealed in an operating mode.

In another aspect, said central actuator is an ignition switch.

In another aspect, the center control module is associated with a forward portion of the motor vehicle interior.

In another aspect, the forward portion comprises an airfoil panel and a first lower panel and a second lower panel.

In another aspect, the plurality of control buttons are disposed beneath the first lower panel and the second lower panel during the concealed mode.

In another aspect, the plurality of control buttons are adjacent to the first lower panel and the second lower panel during the operating mode.

In another aspect, the plurality of control buttons may control a display region.

In another aspect, the invention provides a side armrest integrated into a door interior of a motor vehicle interior comprising a concealed mode in which a top panel of said side armrest is disposed against an upper side panel and an operating mode in which said side armrest is revealed and substantially lowered from the upper side panel.

In another aspect, the door interior includes a handle bar that is disposed along the upper side panel during the concealed mode.

In another aspect, the door interior includes a handle bar that is disposed below the upper side panel during the operating mode.

In another aspect, the top panel includes a control panel.

In another aspect, the control panel is associated with electronic windows.

In another aspect, the control panel is associated with power locks.

In another aspect, the upper side panel includes a button configured to open and/or close a door.

In another aspect, the invention provides a front seat compartment of a motor vehicle interior comprising a concealed mode in which a majority of a display region is hidden from view within a forward portion, a gear shifter is hidden from view in a central console, a center armrest is hidden from view with said central console, a set of control buttons associated with a central control module are hidden from view within said forward portion, and a side armrest is hidden from view within a door interior, and comprising an operating mode in which the entirety of said display region is revealed with said forward portion, said gear shifter is revealed within said central console, said center armrest is revealed within said central console, said set of control buttons are revealed within said forward portion, and said side armrest is revealed within said door interior.

In another aspect, the display region is an upper display region.

In another aspect, the forward portion includes a lower display region.

In another aspect, the forward portion comprises an airfoil panel, a first lower panel and a second lower panel.

In another aspect, the motor vehicle interior includes a steering wheel.

In another aspect, the steering wheel includes a translucent panel display.

Other configurations, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views. In the drawings.

DETAILED DESCRIPTION

Figure 1:
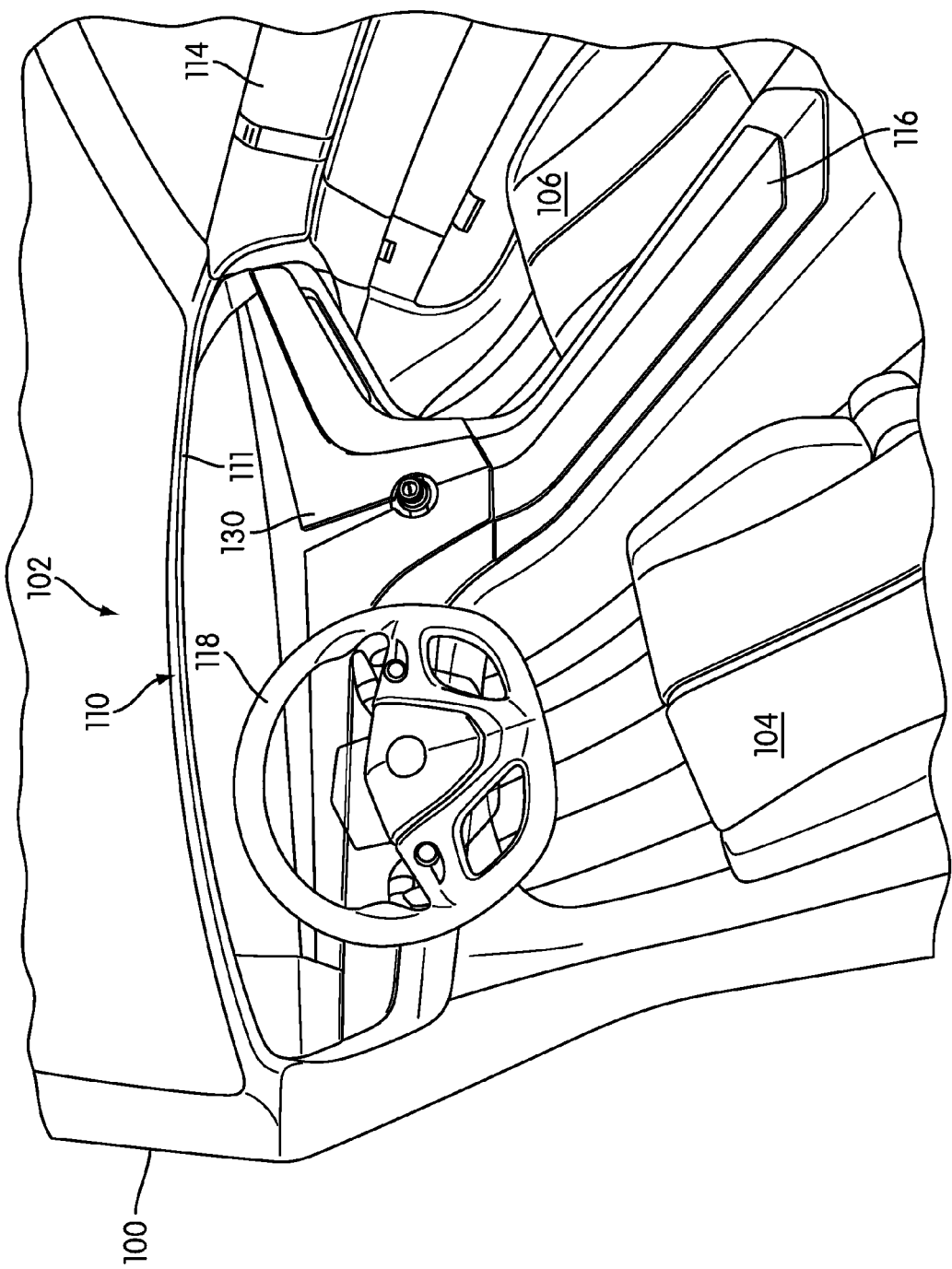
FIG. 1 is a perspective view of a front seat compartment of a vehicle in the concealed default condition.
Figure 2:
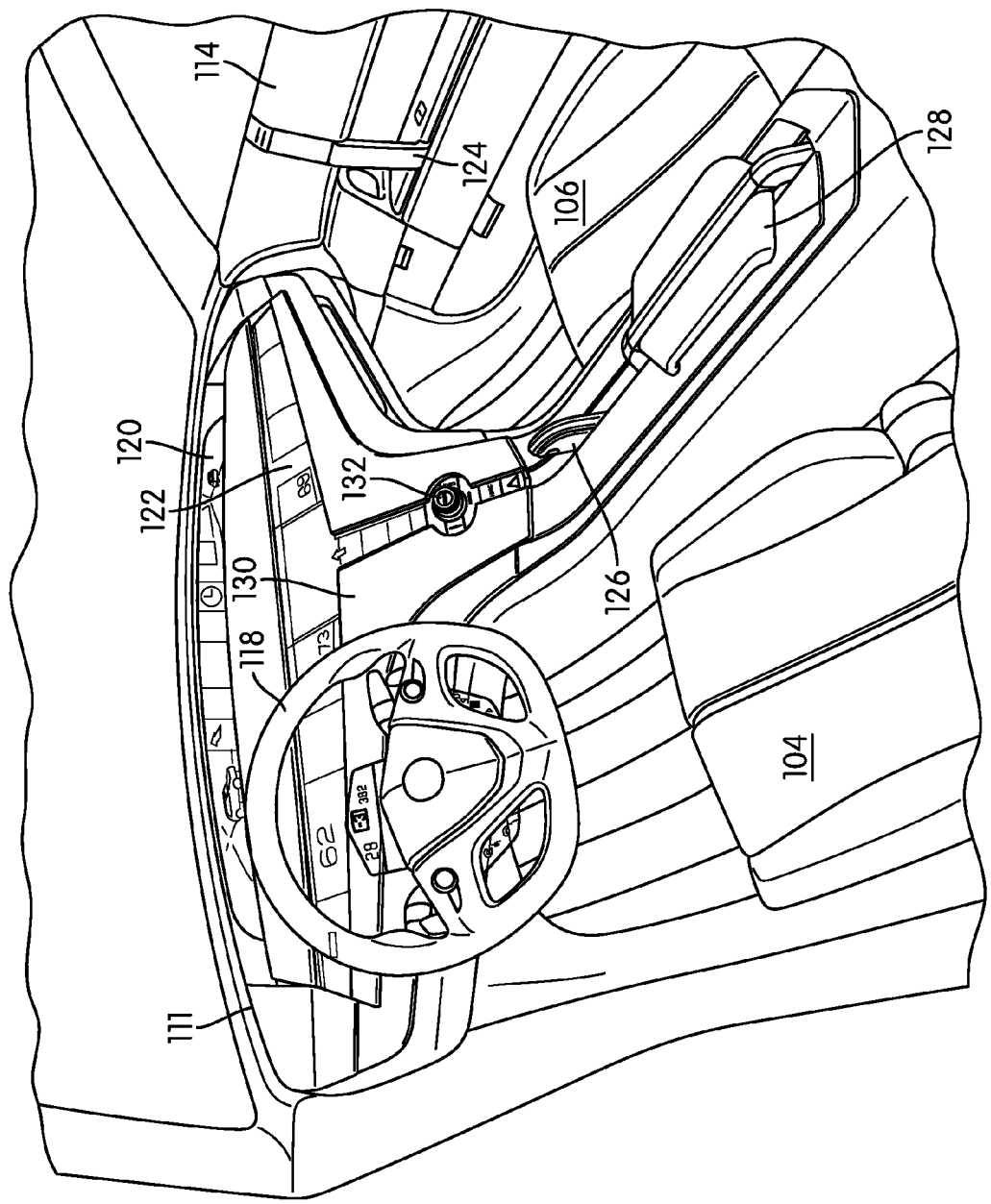
FIG. 2 is a perspective view similar to FIG. 1 showing the operating condition.

FIGS. 1-2 are partial perspective views of front seat compartment 102 of motor vehicle 100, FIG. 1 showing the elements in their default conditions, and FIG. 2 showing the elements in their operating conditions. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUV's, motorcycles, scooters, boats, personal watercraft, and aircraft. For ease of explanation, the driver and passenger sides of the vehicle are referenced throughout using the drive-on-the-right standard orientation. It is understood that those positions are reversed in the British/Japanese standard orientation, with the pertinent elements positioned appropriately, and that such reversal is within the scope of the present invention.

In the illustrated embodiment, front seat compartment 102 comprises two seats, driver seat 104 and passenger seat 106. In addition, front seat compartment 102 comprises a forward portion 110, as well as side portions 112 (best seen in other FIGS.) and 114 which in this embodiment are associated with the front door interiors of motor vehicle 100. Front seat compartment 102 further comprises center console 116 and steering wheel 118. Forward portion 110 comprises an instrument panel area 111 and a center control area 130 including an ignition or start control 132.

Preferably, motor vehicle 100 includes some types of theft deterrents. In some embodiments, motor vehicle 100 may include provisions for minimizing the visibility of various electronic components that may elicit unwanted attention from potential thieves. In a preferred embodiment, motor vehicle 100 may include provisions for completely concealing various electronic components and/or other components found within a vehicle front interior.

FIGS. 1-4 represent the two modes of the entirety of front seat compartment 102. The various components discussed here are only meant to be illustrative of how some components associated with front seat compartment 102 may be concealed in a default mode and displayed in an operating mode. In other embodiments other components are hidden, including components that are not shown in FIGS. 1 and 2.

Figure 3:
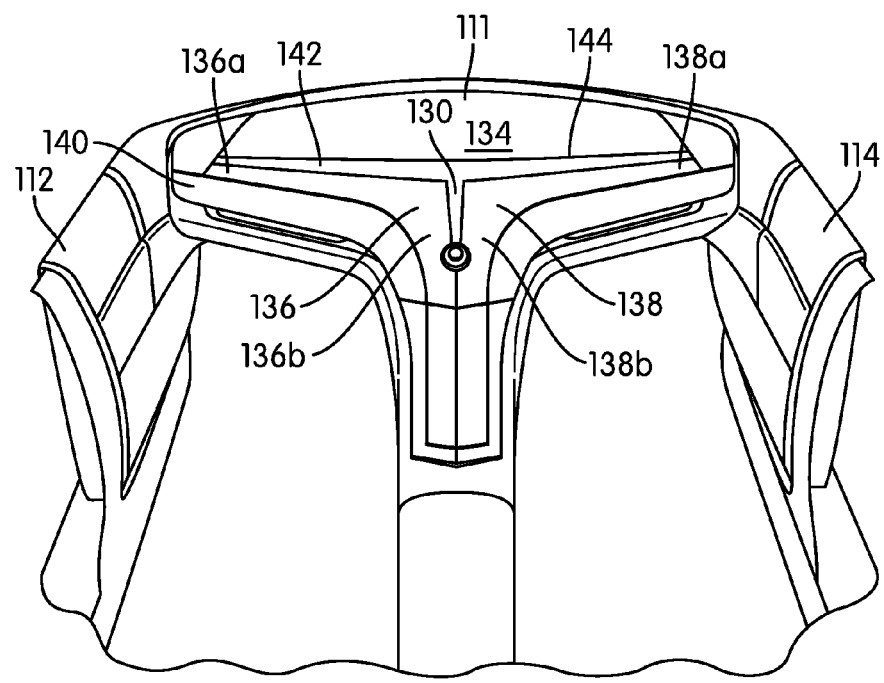
FIG. 3 is a view of the front door interiors and front dashboard in the concealed default condition.
Figure 4:
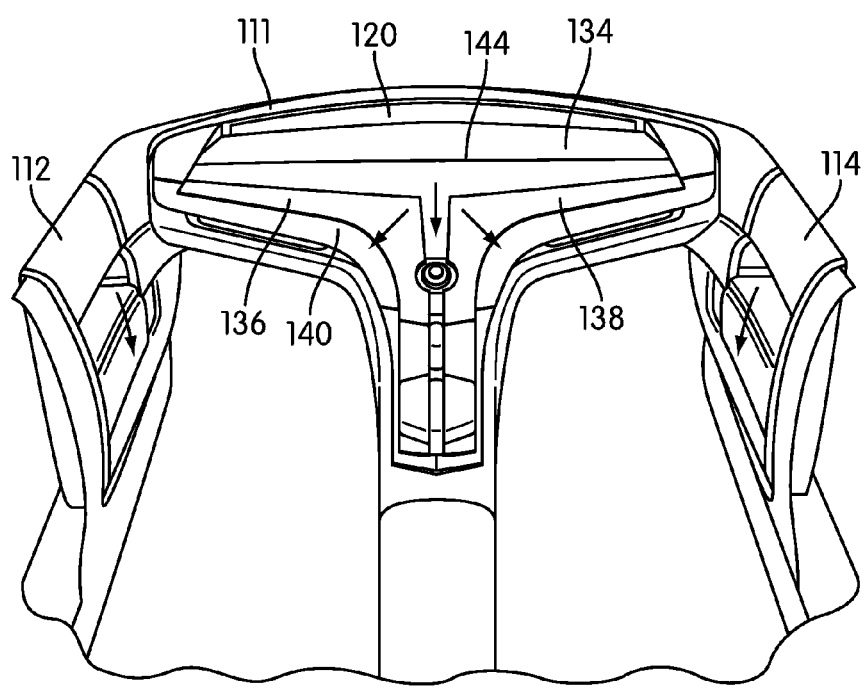
FIG. 4 is a view similar to FIG. 3 of the front door interiors and front dashboard in the operating condition with movable areas indicated.

In FIGS. 1 and 3, which illustrate the default condition, various electronic and mechanical components are concealed from view. Closer inspection of FIGS. 1 and 3 reveals that not only are no electronic components visible, but door handles and even a gear shifter are not visible. In contrast to this concealed mode, FIGS. 2 and 4 illustrate the operating condition of the elements where multiple electronic components, display areas and various mechanical components are visible. FIGS. 3 and 4 are schematic views of the concealed and operating conditions illustrated without a steering wheel to better show forward portion 110. FIG. 4 schematically illustrates the transition between the concealed condition and the operating condition of the forward portion 110 which is achieved through movement of a plurality of panels. The four main elements of front seat compartment which each have the concealed and operating conditions are instrument panel 111, central control area 130, center console 116, and door interiors 112 and 114. As mentioned in the Summary, these elements may all be actuated simultaneously into an operating condition. Alternatively, it is within the scope of the invention to independently actuate each of these elements into their respective operating conditions while leaving others of the elements in the concealed default condition. Depending on the driving or operating situation, any combination of the elements being in the concealed default condition or in their operating conditions is within the purview of the invention. In addition, depending on the context, the term "default condition" may refer to all of the components being in their closed and concealed mode, and the term "operating condition" may refer to all of the components being in their revealed and operating modes; or those terms could refer to the modes of each of the components. Each of the four main elements will be described in turn.

With regard to instrument panel 111, FIGS. 1-4 are illustrative of the default and operating conditions and the transition therebetween. Instrument panel 111 is mounted to the vehicle interior front wall and comprises an upper display region 120 and lower display region 122. As seen in FIGS. 3 and 4, the transition between a concealed default condition and an operating condition of instrument panel 111 is achieved through the movement of several panels. The movable panels include an airfoil shaped panel 134 and a pair of L-shaped center panels 136 and 138. In the concealed mode, airfoil 134, first lower panel 136 and second lower panel 138 may be coincident with peripheral panel 140 of forward portion 110. With this arrangement, airfoil 134, first lower panel 136, second lower panel 138 and peripheral panel 140 give the appearance of being seamlessly formed together. In the concealed default condition of the illustrated embodiment, it can be seen that upper display region 120 is completely concealed, but that lower display region 122 is only partially concealed. The movable panels could be designed in other embodiments to completely conceal the lower display region as well or to partially conceal the upper display, or any suitable combination.

When actuated into the operating condition, airfoil panel 134 which is mounted to the instrument panel to cover upper display region 120 moves in a flap-like manner about a rotation axis 144 so that its free edge moves downward to reveal upper display region 120. This is best seen in FIGS. 3 and 4. It is possible that the rotation axis of airfoil panel be located between the edges of the airfoil or at an edge thereof. If located between the edges, both edges would move when the airfoil rotates. In this manner it is possible that the movement of airfoil panel 134 results in both the upper display region and lower display region being revealed to some extent.

L-shaped center panels 136 and 138 correspond to the driver and passenger sides respectively. Panels 136 and 138 are movably mounted onto instrument panel 111 such that longer legs 136a and 138a of each of the L-shapes are in a horizontal orientation and at least partially cover lower display region 122. Shorter legs 136b and 138b of the L-shapes are in opposing relation to one another and cover most of central control area 130. When actuated, center panels 136 and 138 move downward and outward as shown by the three arrows on forward portion 110 in FIG. 4 to reveal the remainder of lower display region 122. In some embodiments, first lower panel 136 may slide downwards and towards driver door interior 112. In some embodiments, lower panels 136 and 138 may overlap with peripheral portion 140. In a preferred embodiment, airfoil 134, first lower panel 136 and second lower panel 138 may move simultaneously. In other embodiments, airfoil 134, first lower panel 136 and second lower panel 136 may move at different times responding to independent actuation.

The portion of the lower display region that is not covered in the default condition is visible through a narrow opening 142. Narrow opening 142 is preferably formed between airfoil 134, first lower panel 136 and second lower panel 138. In a preferred embodiment, during this concealed mode, no displays or instrument panels may be visible through narrow opening 142. In other embodiments, however, some displays may be visible. For example, in some embodiments a clock display, GPS audio system controls or other elements may be visible.

As seen in FIG. 4, upper display region 120 and lower display region 122 may become visible to the vehicle operator as airfoil 134 rotates. Lower display region 122 may be further widened as lower panels 136 and 138 slide downwards. Upper display region 120 and lower display region 122 may display many different kinds of information for the user. Additionally, a user may interact with upper display 120 and lower display 122 via a touch screen environment, voice activation, or through more traditional controls such as buttons, knobs, switches, sliding selectors, and other kinds of controls. Examples of various meters, displays and controls include, but are not limited to, speedometers, tachometers, videos from various cameras associated with motor vehicle 100, thermostat controls and/or readings, audio displays and/or controls, navigational displays and/or controls, engine temperature meters, oil pressure gauges, tire pressure gauges, fuel meters, airbag indicators, seatbelt indicators, headlight controls, windshield wiper controls, energy consumption displays, fuel efficiency displays, as well as other kinds of information and/or controls. It should be understood that there is an almost inexhaustible list of possible display information and/or controls that may be associated with a vehicle's instrumentation panel, and therefore the preceding list is only meant to be exemplary. Generally, any kind of information displays and/or control systems may be incorporated into either upper display region 120 or lower display region 122.

With this display arrangement, many of the electronic devices, such as radios, tape players, cd players, built-in mp3 players, navigational systems, as well as other electronic devices that are commonly viewable to a potential thief, will be hidden when motor vehicle is in concealed mode. This preferably reduces the risk of the car being broken into by a thief looking to steal radios, or other expensive electronic equipment. Furthermore, a thief who may wish to steal the car would be unable to make use of many of the informational displays such as an speedometer needed to successfully operate a vehicle.

Figure 5:
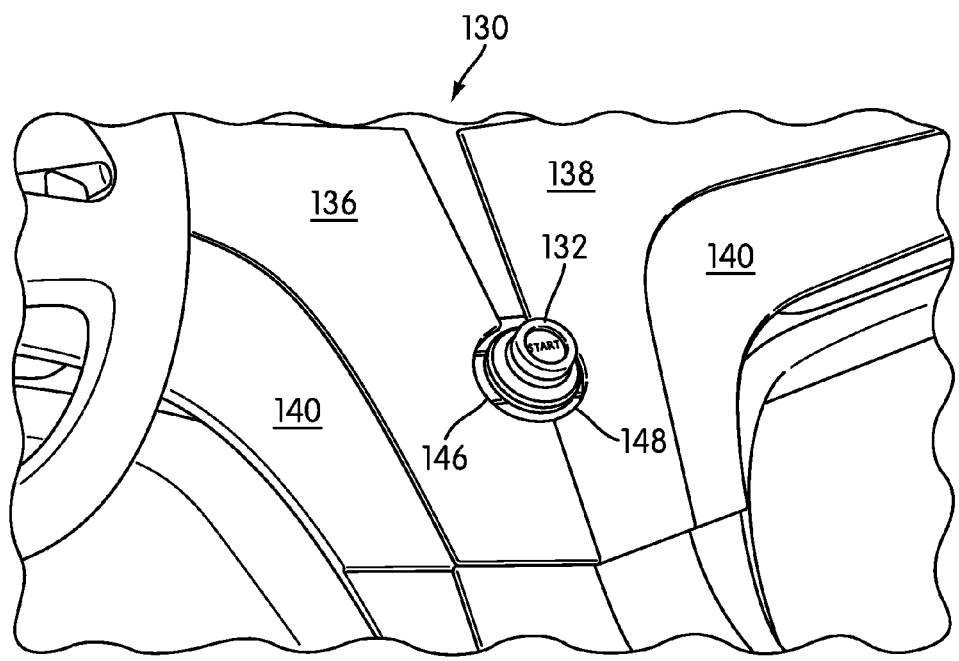
FIG. 5 is a close-up perspective view of the central control module in the concealed default condition.
Figure 6:
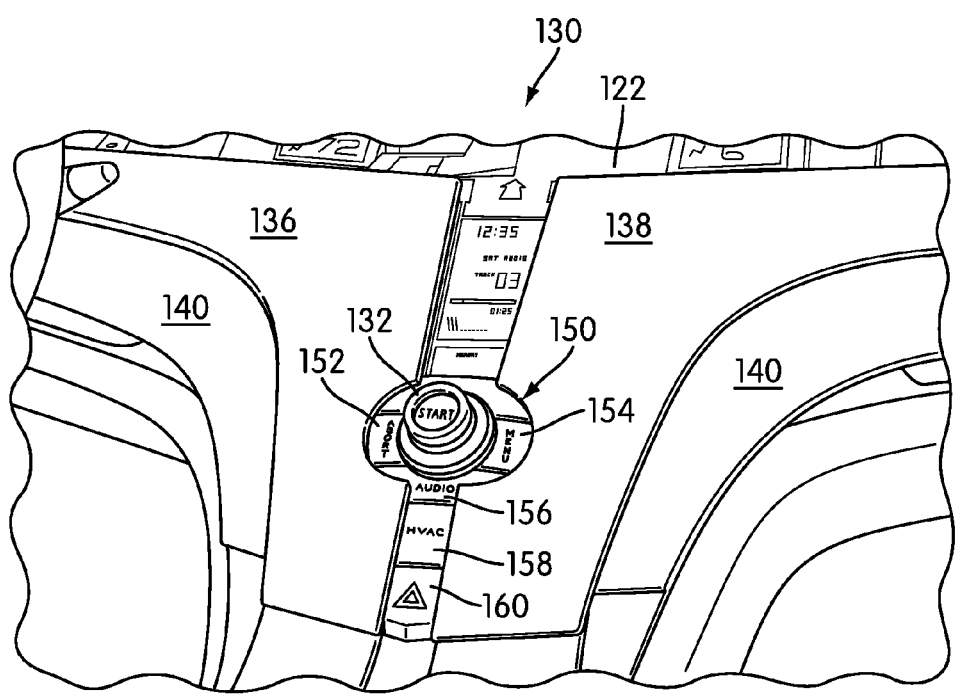
FIG. 6 is a close-up perspective view of the central control module in the operating condition.

Another main element of front seat compartment 102 is the central control area 130, and FIGS. 5-6 provide a close-up view of same. In some embodiments, first lower panel 136 and second lower panel 138 may include first cutout 146 and second cutout 148, respectively, to accommodate actuator 132. Preferably, when forward portion 110 is in the concealed mode, only actuator 132 may be visible through cutouts 146 and 148. However, as lower panels 136 and 138 separate when actuated to the operating mode, an additional set of controls may become visible, as best seen in FIG. 6. This set of control buttons, with actuator 132, preferably comprise central control module 150.

In some embodiments, center control module 150 may be used to select various displays and/or controls associated with upper display region 120 and/or lower display region 122. Often, the amount of available information that may be supplied to a driver can be overwhelming. In some cases, there may be more information available than can be reasonably fit along upper display region 120 and lower display region 122. In these cases it may be useful to give the user a means of selecting which information and/or controls to display, as well as allowing the user to select where the information should be displayed. For example, some users may prefer that the speedometer is situated directly behind the steering wheel, while other may prefer that the speedometer is disposed along a central area of upper display region 120. Using center control module 150, a user may preferably select what information may be displayed along display regions 120 and 122. Additionally, using center control module 150, a user may preferably select where various types of information may be displayed. In addition, the separate buttons of central control module 150 can be used to display only the information or controls necessary for the feature selected. This helps to deliver the information to driver in a less cluttered and confusing way thereby preventing loss of road awareness while driving.

Referring to FIG. 6, central control module 150 includes a Start button 132, and an Abort button 152, and a Menu button 154 flanking the Start button on either side. Arranged below the Start button in a column are an Audio button 156, an HVAC button 158 and a hazard button 160. The Start button may be programmed to be the ignition switch and/or the actuator to transition the front seat compartment from the default concealed mode to an operating mode. Abort button 152 may be used to cancel a previously selected action, or to quit from a menu, or return upper display region 120 and lower display region 122 to their initial configurations. Menu button 154 may be used to bring up a general menu on either upper display region 120, lower display region 122 or both, allowing the user to select from a list of various options associated with various electronic components. Audio button 156 may bring up a set of audio controls such as bass levels, treble levels, balance, fade, and other similar controls on upper display region 120 and/or lower display region 122. HVAC (heating, ventilation and air conditioning) button 158 may bring up multiple options related to temperature and climate control. Hazard button displays the vehicle's hazard lights when depressed and may also activate a remote help service through the vehicle's navigational system. These buttons in center control module 150 represent the "hard" buttons that are fixed as to their function. The controls that are brought up on the display areas and controlled by touch screen regions on the displays or by voice commands are the so-called "soft" controls which may be programmable. Although five buttons are shown in this embodiment, other embodiments may include less than five or more than five button associated with center control module 150.

Figure 7:
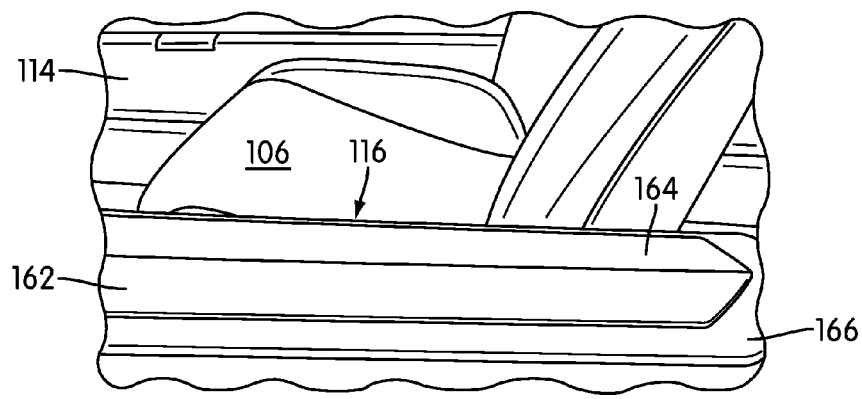
FIG. 7 is a close-up perspective view of the center console in the concealed default condition.

Another main element of front seat compartment 102 is the center console located between seats 104 and 106. Preferably, center console 116 may include a driver side console panel 162 and passenger side console panel 164 disposed on peripheral panel 166, as seen in FIG. 7. In some embodiments, while center console 116 is in the concealed mode, first panel 162 and second panel 164 may be seamlessly disposed and alongside and flush with one another. In other words, first console panel 162 and second console panel 164 may give the appearance of a single solid panel. Center console 116 houses both a gear shifter 126 and a center armrest 128 underneath the console panels.

Figure 8:
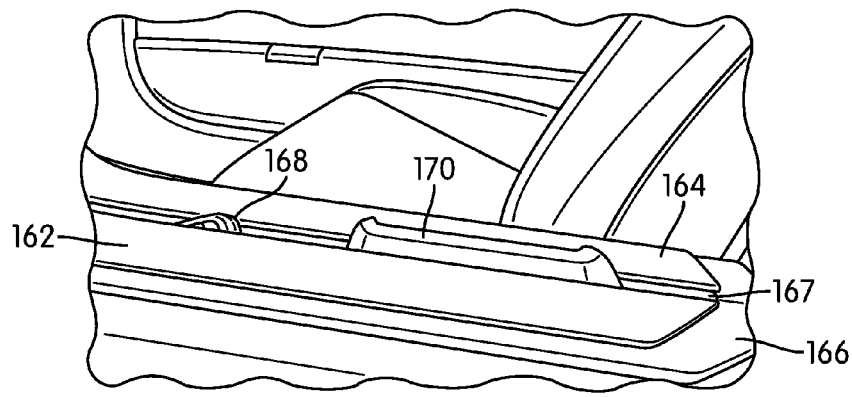
FIGS. 8-10 are close-up perspective views of the center console showing various stages of the panels opening and the components being revealed.
Figure 9:
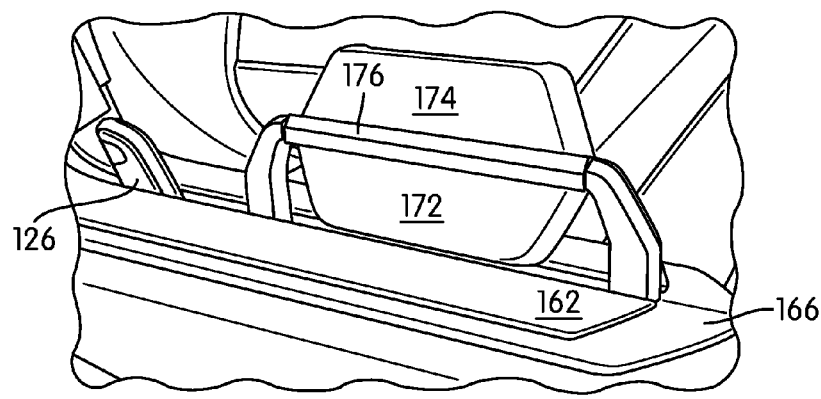
Figure 10:
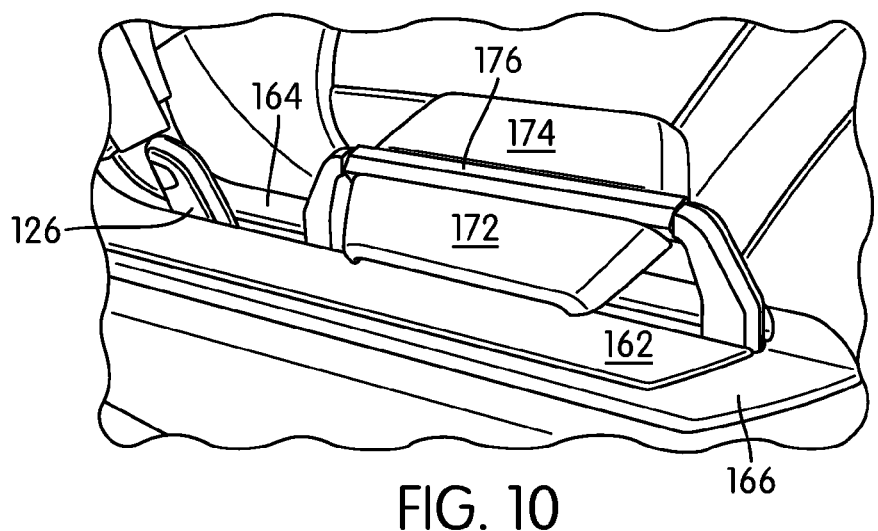
Figure 11:
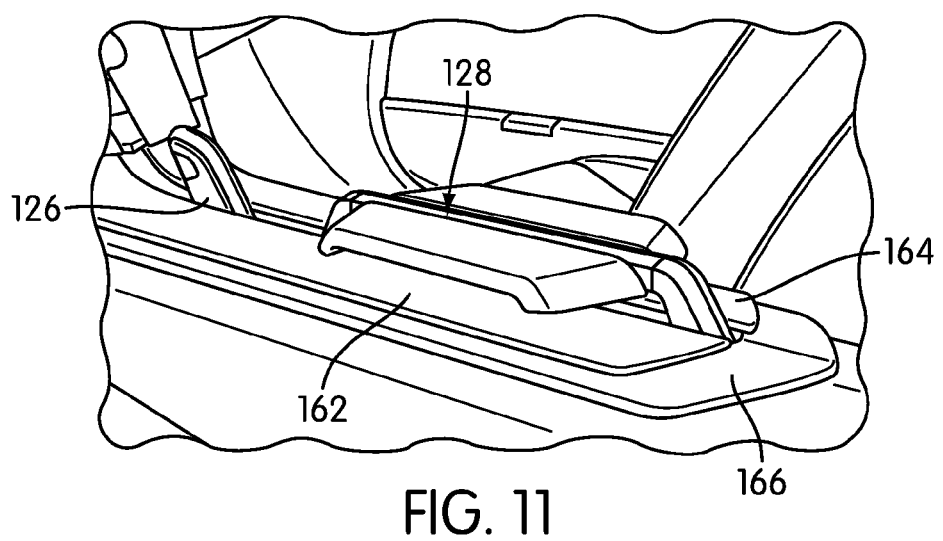
FIG. 11 is a close-up perspective view of the center console area in the operating condition.

Referring to FIGS. 8-11, the transition from the concealed mode to the operating mode of center console 116 is illustrated as a series of steps. During a first step, once a user has selected the operating mode, first console panel 162 and second console panel 164 begin sliding outwards and away from one another to form opening 167. Simultaneously, during this first step, forward side 168 of gear shifter 126 and a passenger edge 170 of center armrest 128 appear through gap 167, as seen in FIG. 8. During a second step, shown in FIG. 9, gear shifter 126 rotates forward into an upright position and center armrest 128 is fully raised through from gap 167 with arm pads 172 and 174 in a vertical orientation with one another and flanking central bar 176. Following this, during a third step, center armrest 128 begins to rotate clockwise about central bar 176. This rotation preferably continues until center armrest 128 is generally parallel to center panels 162 and 164. Finally, during a fourth and final step, center armrest 128 is lowered until it is just above center panels 162 and 164. In some embodiments, this last step may be modified so that center armrest 128 is lowered to a height that is most comfortable for the driver and/or passenger. In other words, in some embodiments, the user may have control over the final height of center armrest 128 following the transition from the concealed mode to the operating mode.

It should be understood that this transition is illustrated in the Figures as a series of discrete steps for the purposes of clarity. In practice, the transition of center console 116 from the concealed mode to the operating mode is continuous and does not occur as a series of individual steps.

The hidden gear shifter arrangement is a very useful anti-theft feature as a thief cannot steal the motor vehicle while the motor vehicle is in the concealed mode due to the lack of a gear shifter. Instead, a would-be thief may enter the motor vehicle, attempt to start the vehicle, and find themselves unable to put the car into drive or reverse. This would certainly thwart any attempt to drive away in the vehicle. In many cases, the thief may be so thoroughly confused by the lack of a gear shifter within motor vehicle 100 that they would immediately abandon any attempts to start the car.

Referring to FIGS. 12-15, door interiors 112 and 114 are also designed to provide a clean, aesthetic appearance but also with a measure of vehicle security. The driver's side door is illustrated in detail in FIGS. 12-15 but it is understood that the other front door will have the same or substantially the same features. As seen in FIGS. 12-15, while the door interiors are in their concealed default mode, driver door interior 112 lacks any handle bar well as other features commonly associated with motor vehicle doors, including window controls, door lock controls, mirror controls, as well as other kinds of controls. In a preferred embodiment, motor vehicle 100 includes provisions such as a handle bar, as well as various controls associated with driver door interior 112, only when motor vehicle 100 is in the operating mode.

Figure 12:
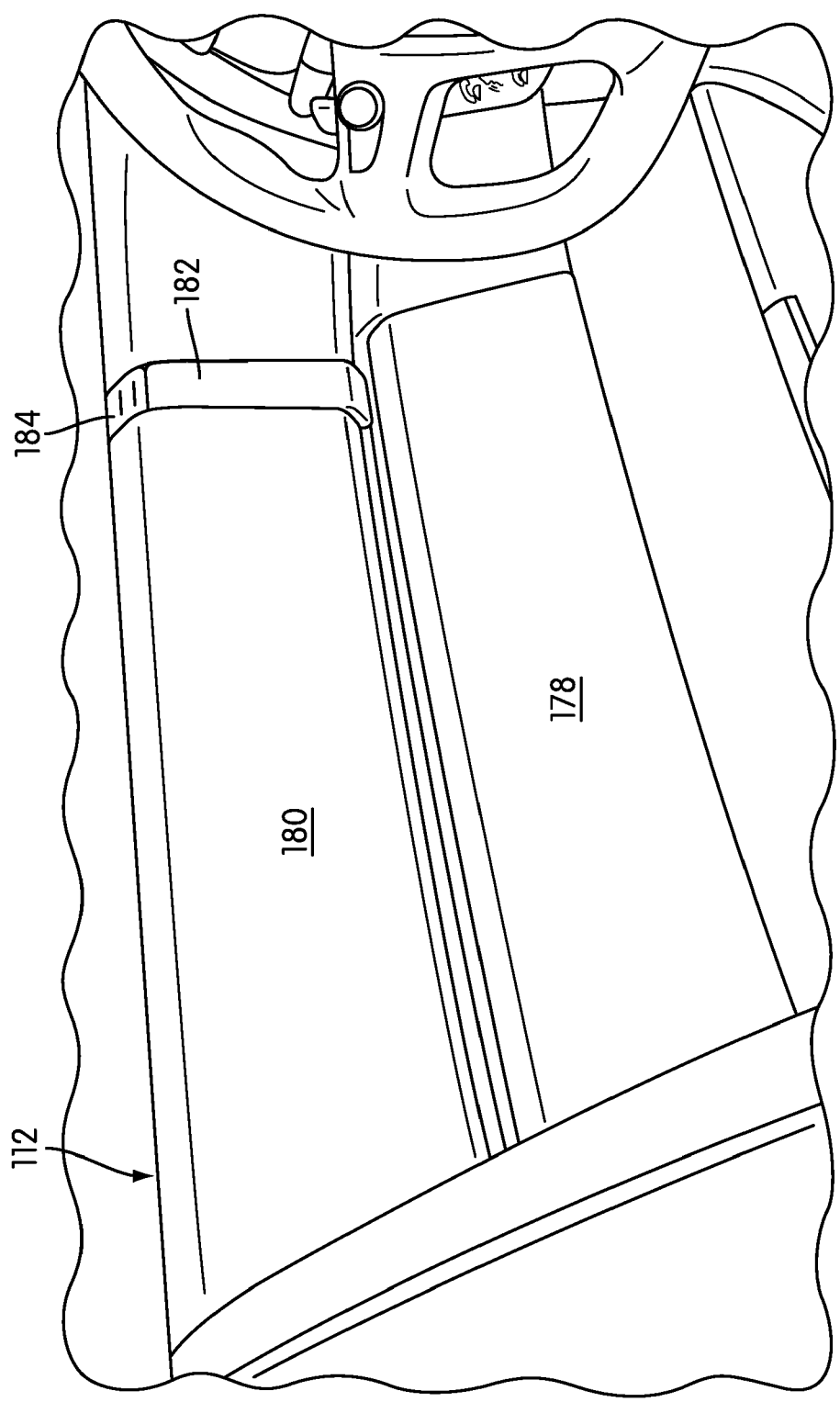
FIG. 12 is a close-up perspective view of a door interior in the concealed default condition.

Referring to FIG. 12 which shows driver door interior 112 in its default concealed condition, interior preferably includes a movable door panel 178. Also, in some embodiments, driver door interior 112 may include upper side panel 180. In a preferred embodiment, grab bar 182 may be embedded within upper side panel 180, during the concealed mode, giving the appearance of being integrally formed with upper side panel 180. A person casually inspecting driver door interior 112 in the concealed mode may conclude that no handle or grab bar is present.

An additional feature of this preferred embodiment is button 184, disposed on upper side panel 180, just above recessed handle bar 182. When a user presses button 184, door 112 may open electronically. Additionally, in some embodiments, button 184 may be used to close door 112. This is an especially useful feature since button 184 may be operated while motor vehicle 100 is in either the concealed mode or in the operating mode, allowing the user to open and close door 112 in either mode.

Figure 13:
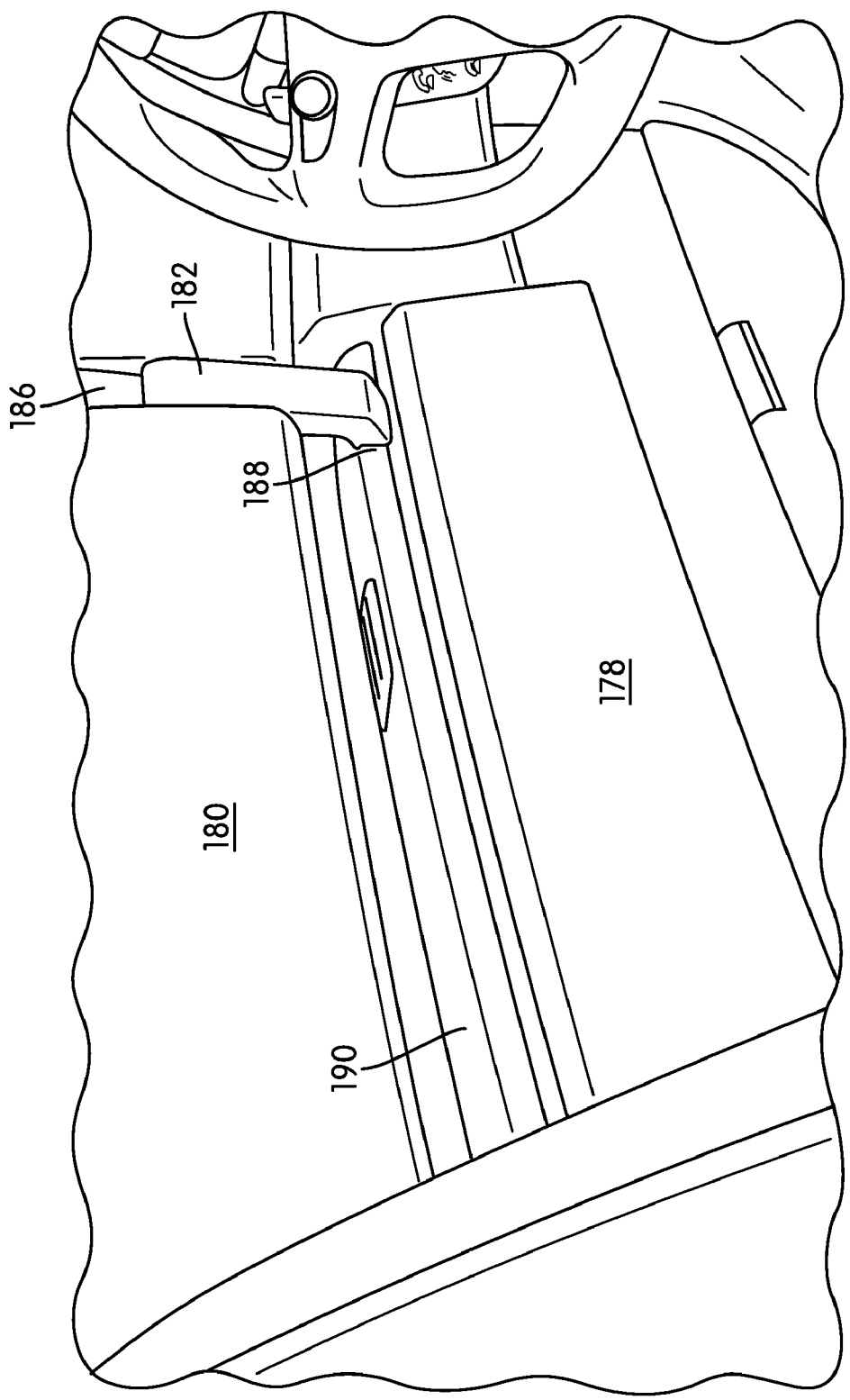
FIG. 13 is a close-up perspective view of a door interior showing the components part-way between the concealed default condition and the operating condition.
Figure 14:
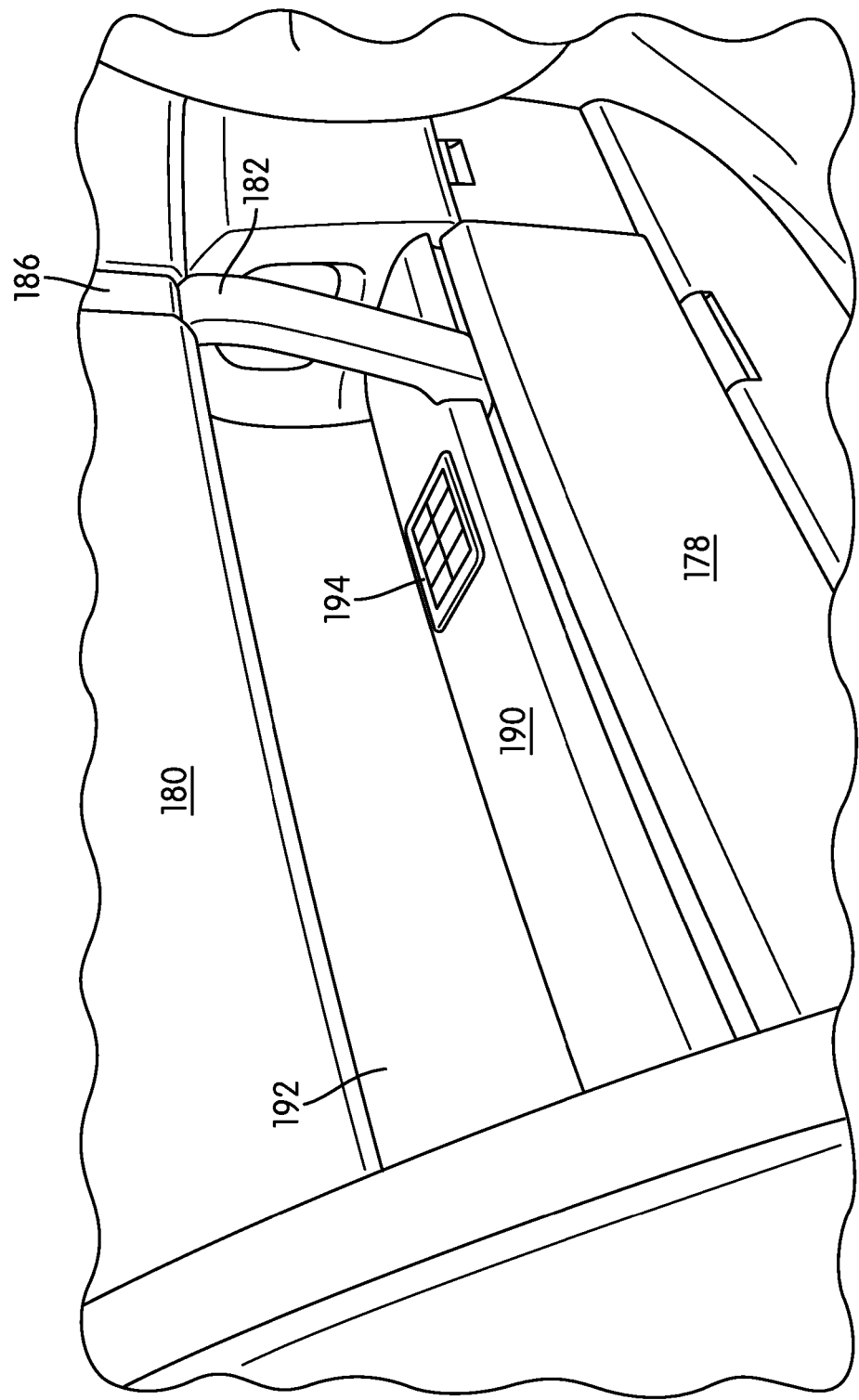
FIG. 14 is a close-up perspective view of a door interior in the operating condition.
Figure 15:
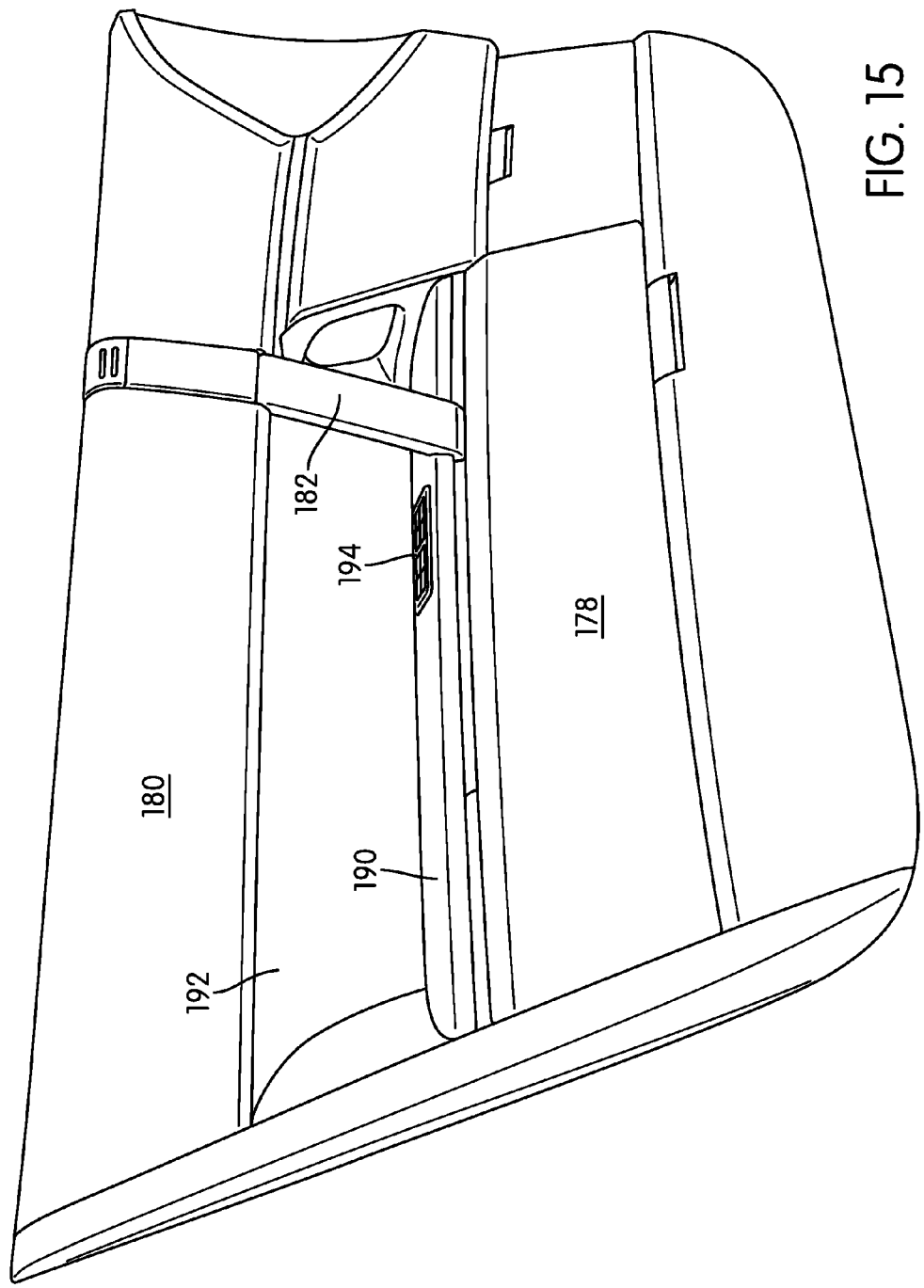
FIG. 15 is a view of the entire door interior in the operating condition.

As motor vehicle 100 or the door by itself is actuated to the operating mode, side panel 178 may begin to lower, as seen in FIG. 13. As side panel 178 lowers, grab bar 182 is also moves downward along recess 186 of upper side panel 180. Grab bar 182 may be directly attached to side panel 178 at ridge 188. It is also possible that movable side panel 178 and grab bar 182 are functionally linked together so that deployment of side panel 178 causes deployment of grap bar 182. Side panel 178 may continue to lower until handle bar 182 is disposed just below recess 186, as seen in FIG. 14. At this point, armrest 190, which is associated with side panel 178, may become fully visible.

Preferably, door armrest 190 is disposed within large recess 192. Large recess 192 provides space for a user to insert their arm and rest it along arm rest 190. In a preferred embodiment, armrest 190 includes control panel 194. Generally, control panel 194 may give the user access to various controls including, but not limited to, window controls, door lock controls, mirror controls, and other controls, including those controls typically associated with a driver's side door. Using this preferred arrangement, a user may also wrap their hand around the periphery of grab bar 182 by way of large recess 192.

Although the current embodiment refers to features associated with the driver's side of motor vehicle 100, it should be understood that substantially similar features may be associated with the passenger's side of motor vehicle 100 as well. In other words, motor vehicle 100 may include a handle bar and various electronic controls that are hidden during the concealed mode but which emerge during the operating mode. In some embodiments, the types of controls associated with the passenger side of motor vehicle 100 may be different than the controls associated with the driver's side.

Figure 16:
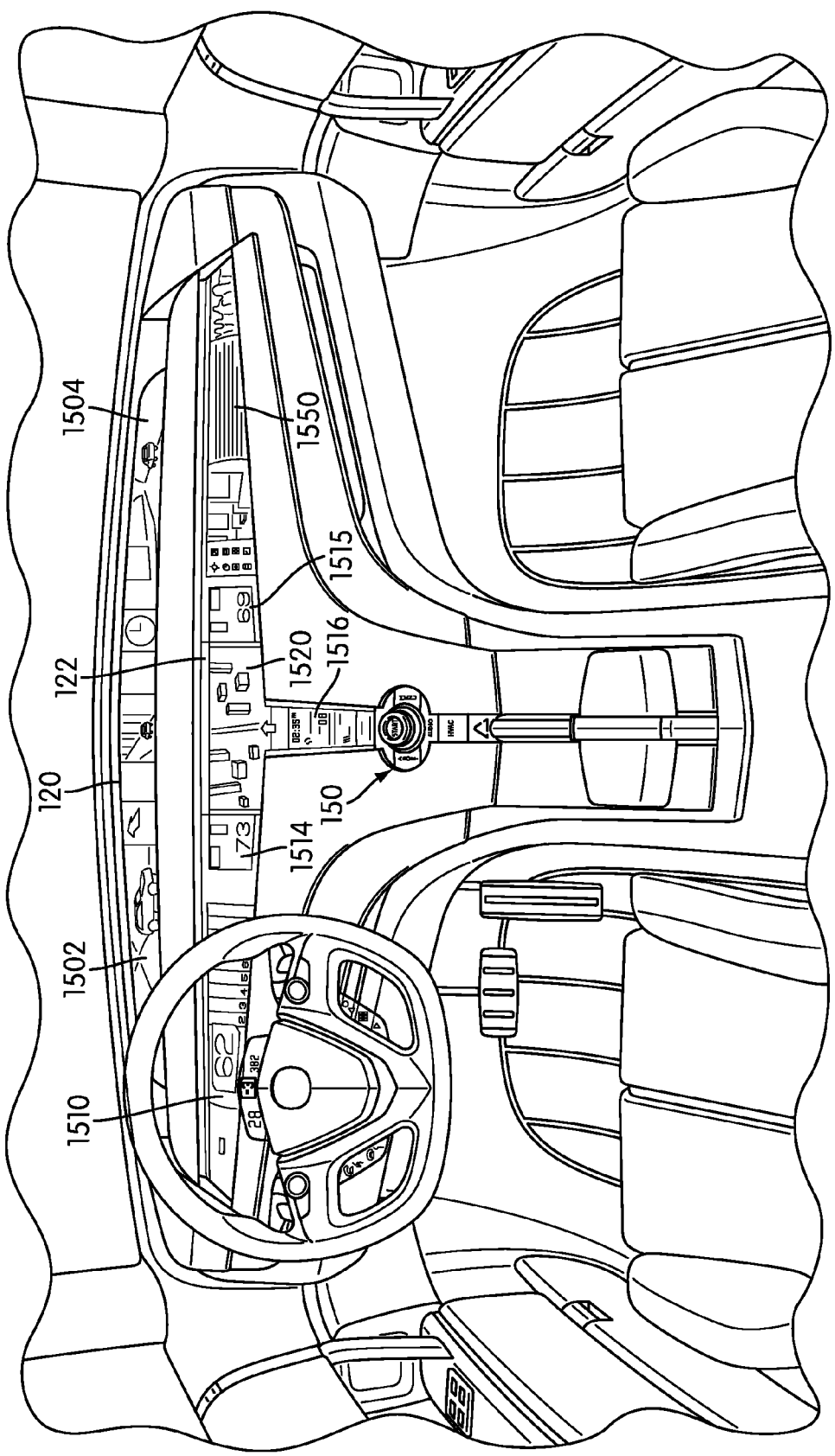
FIG. 16 is a detailed view of the instrument panel, central control module and center console in the operating condition.

FIG. 16 is a preferred embodiment of forward portion 110 of motor vehicle 100 in the operating mode. As previously discussed, upper display region 120 and lower display region 122 may be configured to include various kinds of information that may be used by the driver and/or other passengers for successful operation of motor vehicle 100. The current embodiment is intended to be an example of one possible configuration.

In this embodiment, upper display region 120 includes two distinct camera views. First camera view 1502 is preferably the view as seen by a first camera oriented along the outside of motor vehicle 100 in order to capture the viewing area commonly associated with a blind-spot on the driver's side of motor vehicle 100. In a similar manner, second camera view 1504 is preferably the view as seen by a second camera disposed on the rear of the motor vehicle configured to capture a rearward looking view from the back of the vehicle. Such a view may be especially useful when a user is reversing, or parallel parking.

Preferably, lower display region 122 may include speedometer 1510. Additionally, lower display region 122 may be associated with various controls including driver HVAC control 1514, passenger HVAC control 1515 as well as audio system control 1516. Preferably, upper display region 120 and lower display region 122 may also include navigational system 1518. Large map display 1520 may be disposed in the center of lower display region 122, while zoomed in map display 1522 may be disposed in the center of upper display region 120. Additionally, direction display 1524 may include an arrow that indicates the direction of the next turn in cases where preset directions are being followed. These various meters, controls and/or other systems are only intended to be representative of what may be displayed and/or controlled using lower display region 122. As previously discussed, a user may select what to display and/or control using center control module 600.

In a preferred embodiment, a front passenger may have access to the internet via web display 1550. Web display 1550 may be used to check email, surf the internet, inquire about additional navigational instructions, as well as to gather other information from the internet. A passenger could, for example, use the internet to locate a nearby hotel, and book a reservation for an overnight stay on a long road trip.

Generally, any method or type of display panels may be used. In a preferred embodiment, each of the display regions 120 and 122 may comprise smoked glass outer surface and an edge lit graphics-clear glass disposed over a photo transparency corresponding to a camera view, an internet screen, or other display. Preferably, the photo transparency is illuminated by a rear ambient light when motor vehicle 100 is in the operating mode. Finally, a neon light may be used to illuminate lower display region 122 when the motor vehicle is in the concealed mode.

Figure 17:
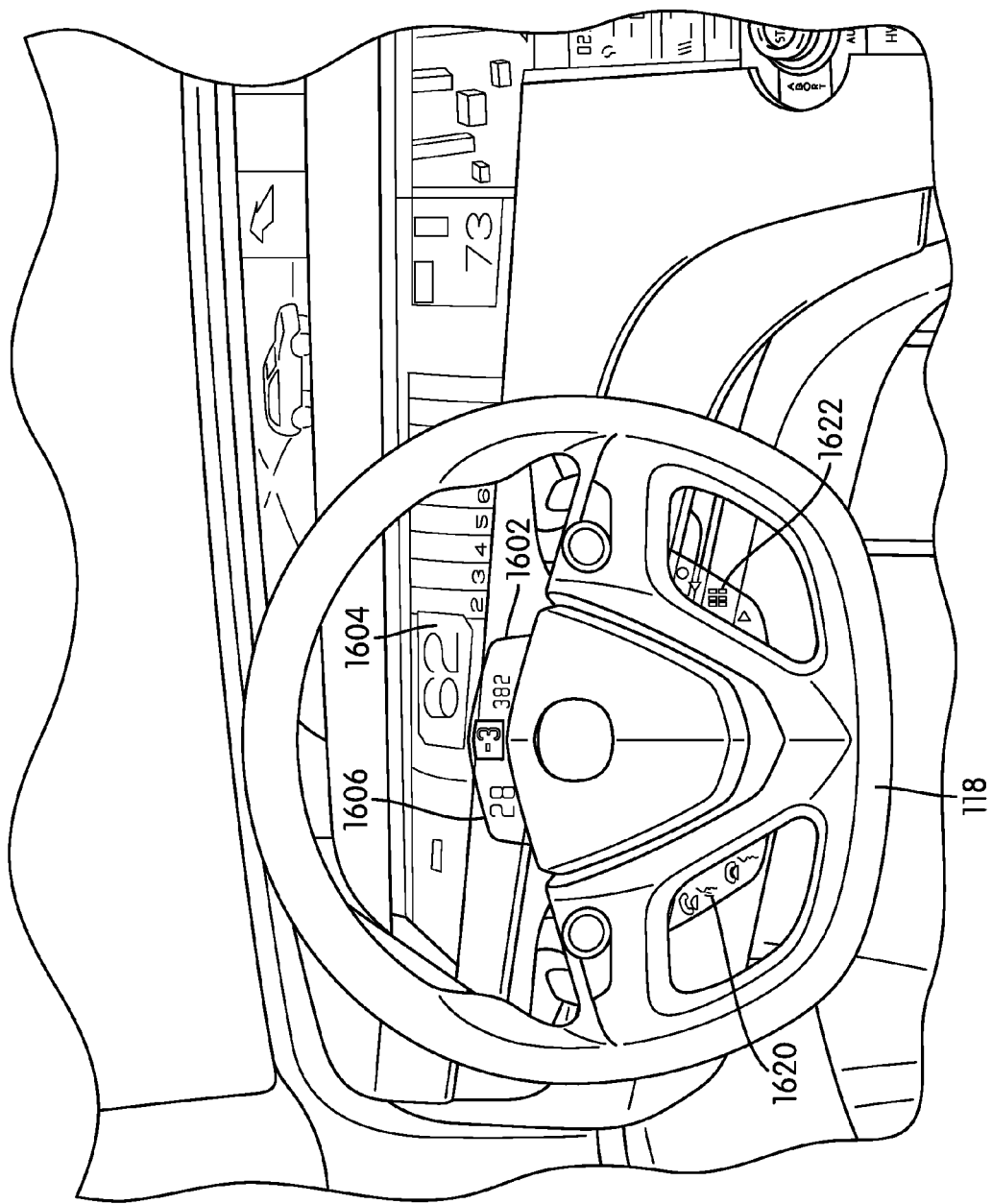
FIG. 17 is a close-up view of the steering wheel and displays behind and around the steering wheel in the operating condition.

Preferably, steering wheel 118 may also include provisions for displaying information. As shown in FIG. 17, steering wheel 118 may include first translucent display 1602. In this embodiment, first translucent display 1602 includes odometer reading 1604, and miles to the gallon reading 1606. Generally, any information may be displayed on first translucent display 1602.

In some embodiments, steering wheel 118 may further include second translucent display 1620 and third translucent display 1622. Translucent displays 1620 and 1622 may be used to control various electronic systems. In this embodiment, first control system 1630 and second control system 1632 may be associated with second translucent display 1620 and third translucent display 1622, respectively. In a similar manner to first translucent display 1602, a user preferably has the ability to select which control systems may be displayed along translucent displays 1620 and 1622. Preferably, translucent displays 1602, 1620 and 1622 include provisions that allow a user to interact with displays 1620 and 1622, further enhancing the usefulness of translucent displays 1602, 1620 and 1622.

Various methods of incorporating translucent displays may be used. In some embodiments, translucent displays may comprise clear glass or plastic panels. Various words, symbols or other indicia may be projected onto these panels from light sources disposed along the dashboard, depending on the required display information. In other embodiments, the translucent panels may include LED or LCD regions rather than using a projection method. Furthermore, each panel may be touch-sensitive, allowing the user to interact with the displays as previously suggested.

By using the translucent displays to provide the user with the most relevant information, as well as access to the most relevant control systems, depending on the operating mode, a user can more easily pay attention to the road since they need only glance down at steering wheel 118 momentarily to gather all relevant information and/or adjust a particular control system. This preferably increases safety while driving. Additionally, translucent displays 1602, 1620 and 1622 may also provide an additional aesthetic appeal to the interior of motor vehicle 100.

As described above, it may be possible for a driver to employ the central control module with a combination of other available controls to configure the displays and controls into a custom configuration. It is within the scope of the invention for such a custom configuration to be stored for an individual authorized user. For example, if there are two authorized users for the vehicle, each person could have a custom configuration that is selectable by any known method such as through a remote key fob, a single or combination of control buttons, or voice activation. Therefore each authorized driver of the vehicle could have his or her most ergonomic array of displays and instruments stored and selected for use.

Generally, any method may be used to select between the default mode and the operating mode. In one embodiment, the user may have a remote (similar to those common in many keyless entry systems) with a button or switch that selects between the concealed mode and the second operational mode. In other embodiments, turning on the power or starting the car using actuator 132 may automatically change the mode of motor vehicle 100 from the default mode to the operating mode. In some cases, the operating mode may be selected by a method that recognizes an authorized user of motor vehicle 100. Examples include, but are not limited to: a key, an RFID key, a Bluetooth signal, a retinal scan, a fingerprint scan, voice recognition, as well as other types of biometric readings.

It is also important to understand that, in some embodiments, each component may be independently selected to be in a default mode or in an operating mode. In other words, in some embodiments, a user may want to view upper display region 120 and lower display region 122, without revealing and/or operating gear shifter 126. In this case, the user may selectively turn front display region 120 and second display region 122 to the operating mode while keeping gear shifter 126 in the concealed mode. This selection may be made using one of the methods described above with slight modifications to incorporate the independent operational modes of various components.

Generally, the method of converting various portions of motor vehicle 100 from the default mode to the operating mode may vary. The following detailed discussion refers to preferred embodiments of how various portions of motor vehicle 100 may transition between the default mode and the operating mode. It should be understood that other embodiments may include different mechanisms for converting between modes, and that the preferred embodiments are only intended as examples. Additionally, physical mechanisms employed in order to move panels, or other moving parts, could be any combination of known elements such as servos, mechanical latch systems with guides and perhaps pneumatic cylinders, as well as other mechanisms that are well known in the art.

To prevent any issues with authorized users not being to transition the vehicle from the default mode to the operating mode due to loss of electrical power, it is within the purview of the invention to provide either or both a battery charge detector to monitor power levels and a manual override system. First, as to a battery charge meter, such a device could be programmed to alert the user of a lower power level based on some predetermined limit so that the user can respond accordingly. Second, the vehicle may include a manual override system comprising that would enable a user or an authorized service technician to manually transition the components from the default mode to the operating mode. The manual override system could involve hand cranks or switches that delatch latched components or the like. It is also with in the scope of the invention to provide an auxiliary power input designed to be used by an authorized technician to power the components from another power source in the event the vehicle battery is removed or disconnected during service.

While various embodiments of the invention have been described, it will be apparent to those of ordinary skill in the art that may more embodiments and implementations are possible that are within the scope of the invention.

What is claimed is:

1. A motor vehicle instrument panel comprising at least one movable panel and a display region, the instrument panel having a default mode in which a majority of said display region is hidden from view, and an operating mode in which the entirety of said display region is revealed, the instrument panel reversibly transitioning from the default mode to the operating mode upon actuation of said movable panel.

2. The instrument panel according to claim 1, wherein said display region comprises a first display region that is partially hidden in the default mode.

3. The instrument panel according to claim 2, wherein said display region comprises a second display region that is completely hidden in the default mode.

4. The instrument panel according to claim 3, wherein said movable panel is an airfoil covering said second display region in the default mode and tilting about an axis such that a free edge moves to reveal said second display region in the operating mode.

5. The instrument panel according to claim 2, comprising a pair of panels movable from a position in which said first display region is partially hidden to a position in which said first display region is completely revealed.

6. The instrument panel according to claim 1, wherein said display region includes a rear camera viewing area.

7. The instrument panel according to claim 1, wherein said display region includes a three dimensional navigational system.

8. The instrument panel according to claim 1, wherein said movable panel has the shape of is airfoil that is tilted when actuated, and further comprising a pair of movable panels that translate when actuated.

9. The instrument panel according to claim 8, wherein the pair of movable panels include a first lower panel and a second lower panel and where the first lower panel and the second lower panel slide down along said instrument panel when actuated.

10. A gear shifter mounted to a center console area of a motor vehicle wherein:
   said center console area is configured to reversibly transition from a default mode to an operating mode;
   said gear shifter is disposed below a first console panel and a second console panel when the center console area is in the default mode;
   the first console panel and the second console panel are disposed against one another when the center console area is in the default mode;
   the first console panel and the second console panel are separated by a gap when the center console area is in the operating mode; and
   said gear shifter extends upward from the center console through the gap between the first console panel and the second console panel when the center console area is in the operating mode.

11. The gear shifter according to claim 10, wherein a center armrest is associated with the center console area.

12. A center arm rest integrated to a center console area of a motor vehicle interior;
   said center console area is configured to reversibly transition from a default mode to an operating mode;
   said center arm rest being retracted down into the center console and hidden from view when the center console area is in the default mode; and
   said center arm rest is revealed and disposed on top of the center console when the center console area is in the operating mode.

13. The center armrest according to claim 12, wherein the center console area comprises a first console panel and a second console panel.

14. The center armrest according to claim 13, wherein the first console panel and the second console panel are disposed against one another during the default mode.

15. The center armrest according to claim 14, wherein the first console panel and the second console panel are separated by a gap during the operating mode.

16. The center armrest according to claim 15, wherein the center armrest is disposed through the gap when during the operating mode.

17. The center armrest according to claim 15, wherein the center armrest is disposed under the first console panel and the second console panel during the default mode.

18. The center armrest according to claim 12, wherein a gear shifter is associated with the center console.

19. A door interior of a motor vehicle comprising an upper panel and a movable panel movably mounted therebeneath;
- the movable panel having a default mode and an operating mode;
- the movable panel being flush against the upper panel in the default mode; and
- the movable panel being spaced a distance below the upper panel to reveal a recess and a door armrest thereon in the operating mode;
- wherein the movable panel reversibly transitions from the default mode to the operating mode.

20. The door interior according to claim 19, further comprising an integrated grab bar that attached to said movable panel and is arranged in a slot on said upper panel in the default mode and across the recess in the operating mode such that it can be grasped about its periphery.

21. The door interior according to claim 19, wherein said door armrest includes a control panel that is visible only in the operating mode.

22. The door interior according to claim 21, wherein the control panel is associated with electronic windows.

23. The door interior according to claim 21, wherein the control panel is associated with power locks.

24. The door interior according to claim 19, wherein the upper side panel includes a door control configured to open and/or close a door.

25. A gear shifter mounted to a center console area of a motor vehicle wherein:
- said center console area is configured to reversibly transition from a default mode to an operating mode;
- said gear shifter is disposed below a console panel when the center console area is in the default mode;
- said console panel being in a closed position when the center console area is in the default mode such that the gear shifter is hidden from view, and said console panel being in an open position when the center console area is in the operating mode so as to create an opening in the center console area; and
- said gear shifter extends upward from the center console through the opening when the center console area is in the operating mode.

* * * * *